United States Patent [19]

Laipply et al.

[11] Patent Number: 4,786,029

[45] Date of Patent: Nov. 22, 1988

[54] CONNECT-AGAINST-PRESSURE COUPLING

[75] Inventors: Robert A. Laipply, Jackson; Brian A. Mack, Horton, both of Mich.; Phillip G. Fuerst, Kalida, Ohio

[73] Assignee: Aeroquip Corporation, Jackson, Mich.

[21] Appl. No.: 118,565

[22] Filed: Nov. 9, 1987

[51] Int. Cl.[4] .............................................. F16L 37/28
[52] U.S. Cl. ........................ 251/149.6; 137/614.05
[58] Field of Search ................... 137/614.04, 614.05, 137/614; 251/149.6

[56] References Cited

U.S. PATENT DOCUMENTS

| | | | |
|---|---|---|---|
| 2,665,928 | 1/1954 | Omon et al. | 137/614.04 |
| 2,735,696 | 2/1956 | Omon et al. | 137/614.05 |
| 3,215,161 | 11/1965 | Goodwin et a. | 137/614.04 |
| 3,348,575 | 10/1967 | Simak | 137/614.05 |
| 3,570,543 | 3/1971 | Ekman | 137/614.04 |
| 3,613,726 | 10/1971 | Torres | 137/614.03 |
| 4,502,662 | 3/1985 | Maldavs et al. | 251/149.6 |
| 4,703,774 | 11/1987 | Seehausen | 137/614.04 |

FOREIGN PATENT DOCUMENTS 2315053  2/1977  France ................. 137/614.04

Primary Examiner—A. Michael Chambers
Attorney, Agent, or Firm—Beaman & Beaman

[57] ABSTRACT

A coupling for use with pressurized systems permitting coupling of valved coupling parts even though one of the parts may be under high pressure. An axially reciprocal valve which automatically opens upon the coupling halves being connected is guided within a shell within the pressurized coupling half and a sealed relationship between the valve and shell minimizes the area of valve surfaces exposed to the pressurized medium reducing the axial forces imposed upon the valve toward the closed position. A bleed valve communicating with the valve interior permits valve operation with hydraulic systems in the event of seal leakage.

2 Claims, 1 Drawing Sheet

CONNECT-AGAINST-PRESSURE COUPLING

BACKGROUND OF THE INVENTION

Pneumatic and hydraulically-operated tools are supplied with pressurized medium from compressors and pumps through flexible hose. The hose system includes a coupling having connectable and disconnectable parts for selectively connecting the tool to the compressor or pump.

At least one of the coupling parts or halves usually includes an axially displaceable valve which is engaged by a probe on the other coupling half which opens the valve during connection of the halves permitting flow through the coupling.

Normally, pressurized medium exists within the valved coupling half and the exposure of valve surfaces transverse to the valve axis of movement to this internal pressure imposes a high axial biasing force on the valve toward the closed position. Thus, very high axial forces must be applied to the coupling halves during connection in order to displace the valve against the pressurized medium forces imposed thereon. In systems having pressurized medium as high as 5000 psi, the forces necessary to achieve coupling connection may be so high that the system must be bled piror to the coupling parts being interconnected.

It is an object of the invention to provide a connectagainst-pressure coupling employing a valve wherein influence of the pressurized medium on the valve toward the closed position is minimal.

A further object of the invention is to provide a connectagainst-pressure coupling for high pressure systems utilizing an axially displaceable valve wherein the valve area exposed to the pressurized medium can be accurately regulated and controlled to prevent excessive axial valve opening forces being required during coupling interconnection of the parts.

Yet an additional object of the present invention is to provide a connect-against-pressure coupling for pressurized systems utilizing an axially displaceable valve wherein axial forces imposed upon the valve toward the closed position are minimized, the construction is economical and readily achieved with conventional machining processes, and bleed means are provided to permit valve operation even in the event of internal hydraulic leakage.

A coupling part in accord with the invention includes a tubular body having an axial passage extending therethrough. One end of the body is connectable to a hose, conduit, or the like, while the other end of the body comprises a connection end for mating with a complementary shaped coupling part. An axially displaceable tubular valve is located within the body passage and includes a valve head engagable with a valve seat defined in the passage for sealing the passage when the valve is in the closed position and a spring biases the valve toward the closed position.

A guide for the innermost part of the valve is fixed within the body passage receiving the innermost portion of the valve and guiding the valve during its axial displacement between open and closed positions. In accord with the invention the guide takes the form of an open-ended shell receiving the valve skirt, and an annular seal is interposed between the shell and valve skirt adjacent the shell open end preventing those portions of the valve inner end of a diameter less than that of the skirt from being exposed to the pressurized medium within the body passage. Ann annular pressure face transverse to the valve length is defined on the head of the valve adjacent the valve seat, and accordingly, the axial force imposed on the valve toward its closed position by the internal pressurized medium is controlled by the area of such transverse face.

The shell is provided with a unidirectional or check bleed valve permitting hydraulic pressurized medium which may have leaked into the shell and valve to escape upon the valve being displaced toward its open position in order to insure proper valve operating during the coupling connection. The bleed valve communicates with the body passage, and its valve element prevents the pressure within the passage from entering the shell and valve.

The practice of the invention minimizes the number of components as compared to known connect-against-pressure balanced couplings and as the shell is bled into the pressurized system no oil leakage to the atmosphere or exterior of the coupling occurs.

BRIEF DESCRIPTION OF THE DRAWINGS.

The aforementioned objects and advantages of the invention will be appreciated from the following description and accompanying drawings wherein.

DESCRIPTION OF THE PREFERRED EMBODIMENT

Figure 1:
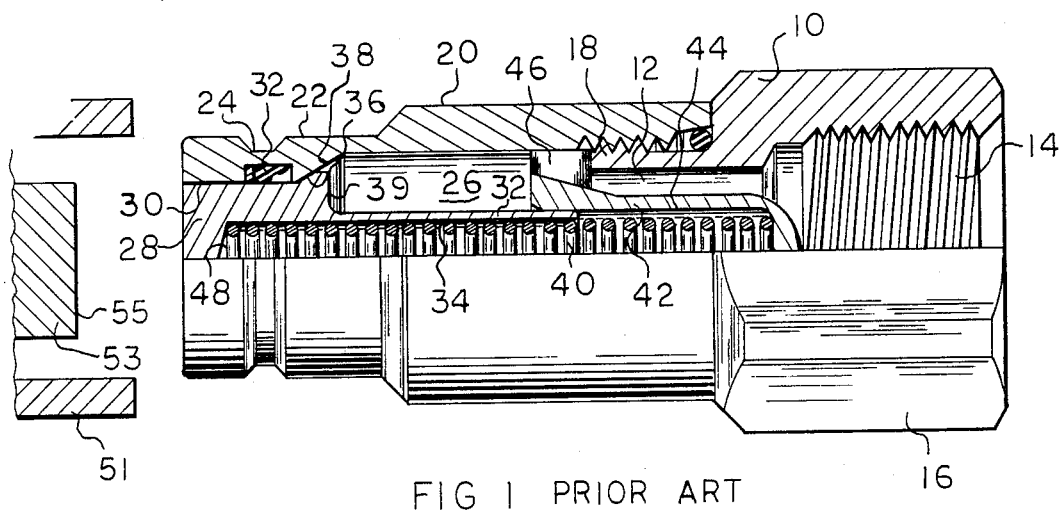
FIG. 1 is an elevational view, partially sectioned, illustrating a prior art connect-against-pressure coupling over which the invention is an improvement.

FIG. 1 illustrates the prior art connect-against-pressure coupling over which the invention is an improvement. While the coupling part in which the invention is incorporated may constitute either the male or female portion of the coupling, the illustrated coupling part is of the male type and the dimensions are such as to correspond to HTMA Standards.

The coupling includes an annular body 10 having an internal concentric passage 12, and the body and passage are internally threaded at 14 for connection of the body to a hose or similar conduit fitting as is well known in the art. Hexagonal flats 16 are defined on the body to receive a wrench.

The body 10 is threaded at 18 to receive the annular nose sleeve 20 having the reduced cylindrical diameter surface 22 in which the locking ball receiving groove 24 is defined. These configurations are well known as determined by the HTMA Standards. Internally, the nose sleeve 20 defines a chamber 26.

A tubular valve 28 is reciprocally mounted in the body 10 and sleeve 20 within the passage 12 and the chamber 26. The valve 28 includes a cylindrical surface 30 closely received within a complementary cylindrical surface defined within the sleeve 20, and the valve further includes a tubular skirt 32 defining the inner portion of the chamber 26. The skirt 32 surrounds the valve internal bore 34.

An annular head 36 is defined upon the valve 28 having a conical surface which sealingly cooperates with the conical valve seat 38 defined on the nose sleeve 20. The head 38 includes the radially disposed surface 39 which forms a face transverse to the length of the valve exposed to the medium pressure within chamber 26.

A compression spring 40 is located within the valve bore 34 and engages the valve face 48 and the end of the spider 44 fixed within the passage 12. The spring 40 biases the valve 28 toward the closed position shown in FIG. 1. Internally, spider 42 is provided with a cylindrical surface 44 telescopingly receiving the valve skirt 32. Internal passage 46 permit the flow of pressurized medium past the spider 42 between passage 12 and chamber 26.

Pressurizing of the interior of body 10 causes the pressurized medium within chamber 26 to exert an axial force on the vavle 28 toward the left, i.e. the closed position, proportional to the annular area of the face 39 which is not subjected to internal pressure forces toward the right due to the pressurized medium. Annular seal 32 engaging surface 30 forms a sealed relationship between the valve and nose sleeve 20, and the difference between the diameter of surface 30 and the innermost diameter of the face 39 will define that area producing a biasing force on the valve 28 toward the left. However, in addition to the forces exerted upon face 39 axial forces are also imposed upon the valve 28 due to fluid flowing between the skirt 32 and the spider 42 such that the pressure within the valve bore 34 acts upon face 48 and the right end of the skirt 32. Thus, those areas defined by the face 48 and the end of skirt 32 additionally impose an axial force on the valve 28 toward the left, and all of the aforementioned pressures must be overcome when connecting the body 10 to the other coupling part 51 as shown in FIG. 1.

The part 51 represents a conventional female coupling part having a probe 53 defined therein having an end surface 55. The coupling part 51 will also include the usual detent locking balls, not shown, for being received within the ball groove 24 when full connection is made.

When the body 10 is aligned with the female part 51 and the parts are moved toward each other such that the probe end 55 engages the end of the valve 28 the axial forces imposed upon the valve 28 by the pressurized medium within body 10 must be overcome to displace the valve to the open condition. As previously discussed, such axial force required to connect the coupling parts may be very high, and require that the pressure within chamber 26 be substantially reduced by turning off the pressure source or bleeding the supply hose or conduit supplying body 10. Upon the body 10 being fully connected to the part 51 the valve 28 will be displaced to the open position to the right sufficiently to permit fluid flow around the head 36 and through both coupling parts.

Figure 2:
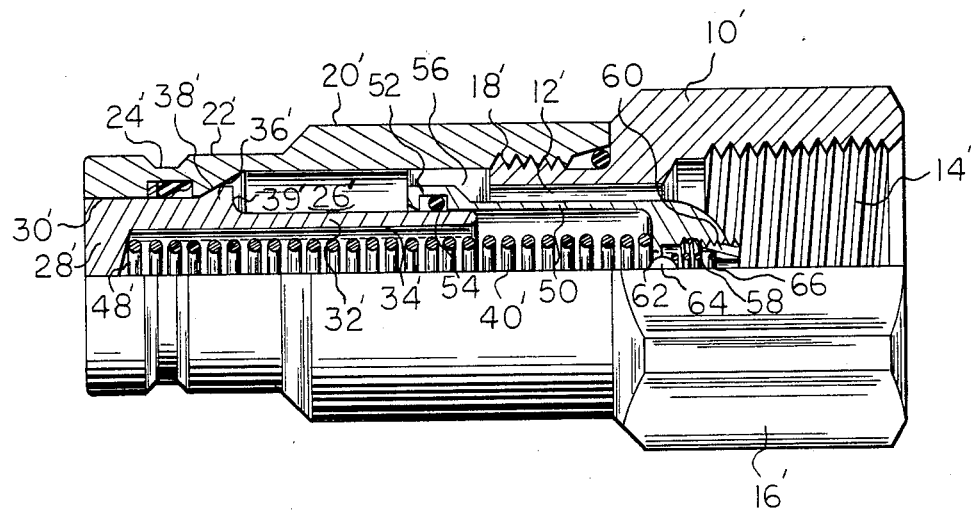
FIG. 2 is an elevational view, partially sectioned, of a coupling in accord with the inventive concepts, the valve being shown in the closed position.
Figure 3:
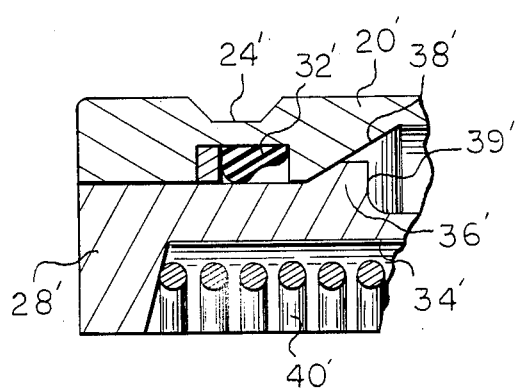
FIG. 3 is an enlarged, sectional, detail view of the valve nose shown in the closed condition.
Figure 4:
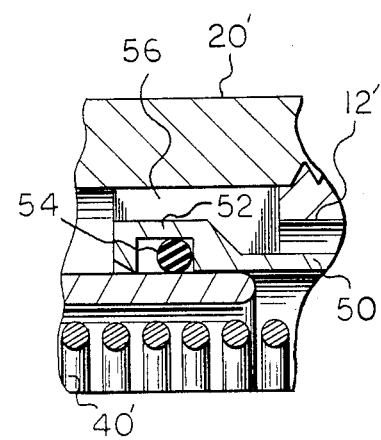
FIG. 4 is an enlarged, detail, elevational, sectional view illustrating the seal interposed between the shell and the valve skirt.

The connect-against-pressure coupling of the invention is illustrated in FIGS. 2-4, and as many of the components are identical to those previously described primed reference numerals have been used to indicate identical components which function in the aforedescribed manner.

The improvement includes the utilization of a shell spider 50 fixed within the body passage 12', and the shell 50 includes an enlarged portion 52 having an internal groove defined therein for receiving the annular elastomeric O-ring 54 which sealingly engages the outer surface of the valve skirt 32'. Thus, the seal 54 will prevent pressurized medium within the chamber 26' from entering the shell 50.

Openings 56 permit the flow of pressurized medium about shell 50 from passage 12' to chamber 26', and the closed end of the shell 50 is concentrically provided with threads 58 for receiving the ball cage 60. The end of the shell 50 is provided with an annular shoulder 62 which engages the check valve ball 64 in a sealing manner, and the ball is biased into engagement with the annular shoulder 62 by the compression spring 66 which also bears upon the ball cage 60. Thus, the ball 64 comprises a unidirectional check valve permitting any fluid or pressurized medium within the shell 50 to pass therefrom into the passage 12'. However, flow of the pressurized medium from the interior of the body 10' into the shell 50 is prevented due to the sealing engagement of the ball 64 with the shoulder 62.

With the coupling of the invention, under normal conditions, the only axial biasing force exerted on the valve 28' toward the left by the pressurized medium is due to that imposed upon surface 39'. Seal 54 prevents the pressurized medium within chamber 26' from passing into the spider shell 50, and accordingly, no internal pressures of significance are imposed upon the valve face 48' or the right end of the valve skirt 32'. The axial forces imposed upon the valve by the spring 40' are not great, and the purpose of this spring is maintain the valve 28' in the closed condition regardless of whether body 10' is under pressure.

Upon connection of the body 10' to the other coupling half the valve 28' is moved to the right within shell 50, and such connection forces required to achieve coupling are relatively small as compared to those required with a coupling as shown in FIG. 1.

In the event that over an extended period of time pressurized medium such as hydraulic oil may leak past seal 54 into shell 50 to fill the shell and valve with oil, the coupling is still operable as the ball 64 will be displaced from valve seat shoulder 62 as the valve 28' is moved to the right. In such instance oil within the valve and shell 50 is bled into the body 10', and does not escape to the atmosphere or surrounding areas.

It will be appreciated that in the practice of the invention conventional manufacturing techniques may be used to manufacture the shell 50 and its associated compoents, and the apparatus of the invention is easily assembled and requires a reduced number of components as compared to known balanced pressure couplings.

It is appreciated that various modifications to the inventive concepts may be apparent to those skilled in the art without departing from the spirit and scope of the invention.

We claim:

1. A connect-against-pressure coupling for a pressurized medium comprising, in combination, a tubular body having an axial passage, a conduit attachment end and a connection end, an annular valve seat defined within said passage adjacent said connection end, an elongated valve axially displaceable within said passage between open and closed positions, said valve having an accessible end adjacent said body connection end for engagement with a coupling probe during connection and a head engageable with said valve seat when in said closed position, a pressure face defined on said head exposed to pressurized medium within said passage wherein medium pressure imposed thereon biases said valve toward said closed position, said valve having a concentric chamber defined therein, a compression spring received within said chamber biasing said valve toward said closed position, a guide defined in said passage having an axially extending guide surface defined thereon, said valve engaging said guide surface and guided thereby during displacement between said open and closed positions, said guide comprising a tubular shell within and concentric to said body passage having an open end disposed toward said body connection end and a cylindrical bore, said valve including a cylindrical skirt telescopingly received within said bore, an annular seal interposed between said bore and valve skirt adjacent said guide shell open end, said guide shielding substantially all transversely disposed surfaces defined on said valve facing away from said valve accessible end from exposure to pressurized medium within said passage except said face whereby the axial force exerted on said valve toward said closed position by the medium is substantially confined to that exerted upon said face, and a unidirectional bleed valve defined in said shell in communication with said body passage and said valve chamber permitting medium flow from said chamber into said passage.

2. In a connect-against-pressure coupling as in claim 1, said bleed valve comprising a check valve including a cage, a valve seat defined in said cage, a ball within said cage and a compression spring within said cage biasing said ball toward said cage valve seat, an opening defined in said shell, said check valve cage being located within said opening.

* * * * *